March 24, 1931.  O. F. ROHWEDDER  1,798,127
FEEDING APPLIANCE FOR BREAD SLICING MACHINES
Filed March 18, 1929  4 Sheets-Sheet 1
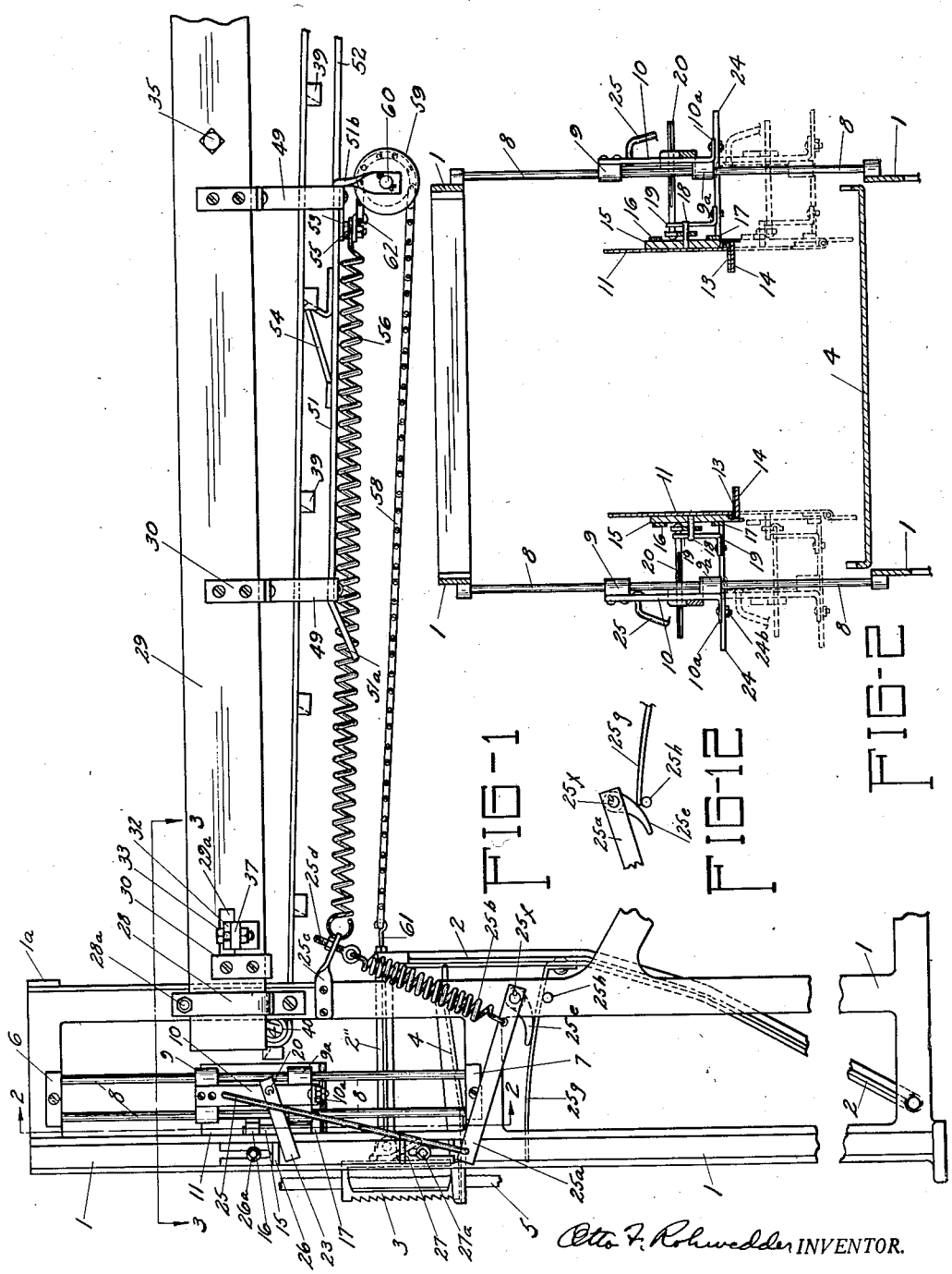
Otto F. Rohwedder INVENTOR.
BY
Curtis Bush ATTORNEY March 24, 1931. O. F. ROHWEDDER 1,798,127
FEEDING APPLIANCE FOR BREAD SLICING MACHINES
Filed March 18, 1929 4 Sheets-Sheet 2

Otto F. Rohwedder INVENTOR.

BY

Curtis Bush ATTORNEY

March 24, 1931.  O. F. ROHWEDDER  1,798,127
FEEDING APPLIANCE FOR BREAD SLICING MACHINES
Filed March 18, 1929    4 Sheets-Sheet 3

Otto F. Rohwedder INVENTOR.
BY
Curtis Bush ATTORNEY

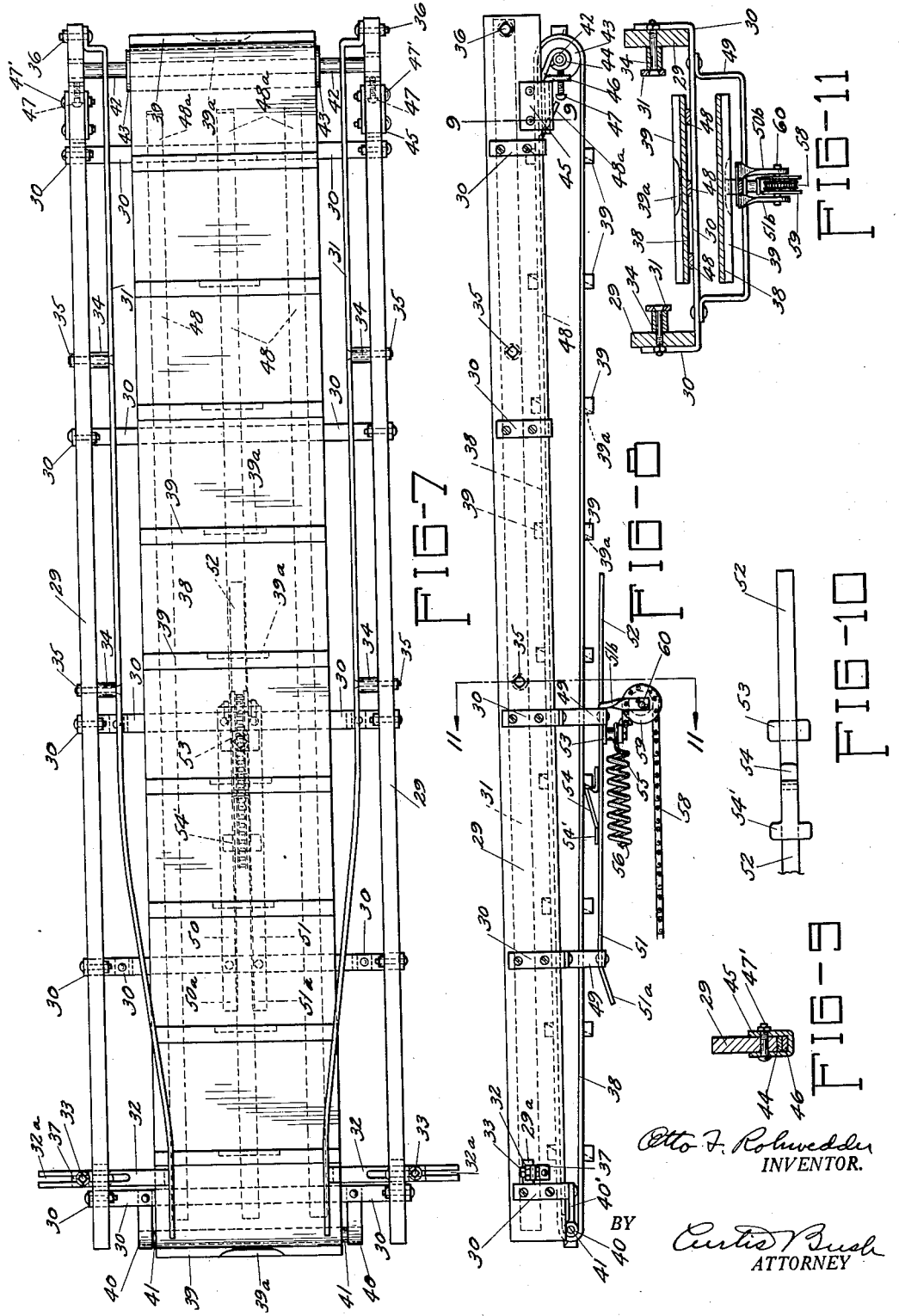

Patented Mar. 24, 1931

1,798,127

UNITED STATES PATENT OFFICE

OTTO F. ROHWEDDER, OF DAVENPORT, IOWA, ASSIGNOR TO MAC-ROH SALES & MFG. COMPANY, OF DAVENPORT, IOWA, A CORPORATION OF DELAWARE

FEEDING APPLIANCE FOR BREAD-SLICING MACHINES

Application filed March 18, 1929. Serial No. 347,838.

This invention relates to bread slicing machines and particularly to feeding mechanisms therefor.

One of the objects of the present invention is to provide a bread slicing machine with new and improved means for feeding bread to the cutting means.

Another object is to provide a bread slicing machine with simple and efficient means for conveying the bread to and depositing it on the cutting table in centered slicing position.

Another object is to provide a bread slicing machine with an improved conveyor mechanism for feeding bread to the machine and with a novel means cooperating with the conveyor to successively receive the bread from the conveyor and deposit the same in slicing position on the cutting table.

A further object is to provide a bread slicing machine with a novel elevator device synchronized with a conveyor mechanism and a bread pusher arrangement, wherein loaves of bread can be successively lowered by mechanical means onto the slicing table in centered slicing position.

With the above and other objects in view, the present invention may be said to comprise the apparatus as illustrated in the accompanying drawings as hereinafter described and particularly set forth in the appended claims, together with such variations and modifications thereof as will be apparent to one skilled in the art to which this invention appertains.

In the accompanying drawings, which illustrate a suitable embodiment of the present invention, Figure 1 is a side elevation of the feeding apparatus applied to a bread cutting machine;

Fig. 2 is a transverse sectional view taken substantially on the line 2—2 of Fig. 1, showing the elevator members or carriers in solid lines in their uppermost position and in dotted lines in their lowermost position;

Fig. 7 is a full length plan view of the conveyor and conveyor frame;

Fig. 8 is a side elevation of the conveyor and conveyor frame, the drive chain and return spring being partially broken away;

Fig. 9 is a transverse section of one of the side bars taken substantially on the line 9—9 of Fig. 8;

Fig. 10 is a plan view of the belt drive bar for the conveyor;

Fig. 11 is a vertical cross-section taken substantially on the line 11—11 of Fig. 8;

Fig. 12 is a side elevation of the driving cam for the elevator and lifting arm showing the position of the same when the pusher is in its rearmost position.

The feeding mechanism of the present invention is particularly adapted to the type of bread slicing machine shown and described in my copending applications, Serial Nos. 249,612 and 290,503, filed Jan. 26, 1928, and July 5, 1928, respectively. It is to be understood, however, that the invention about to be described is equally adaptable to any other type of slicing machine, such as those embodying continuous cutting blades.

For clearness of illustration, the driving mechanism is omitted and the cutting blades are only partially shown.

Figure 3:
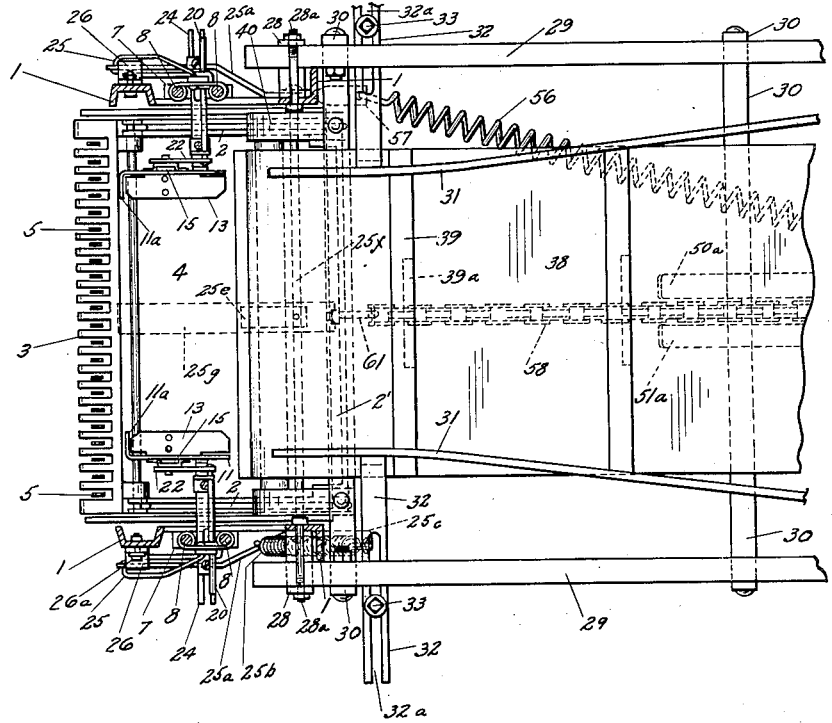
Fig. 3 is a vertical plan view of the feeding apparatus, the rear end of the conveyor and conveyor frame being broken away.

Referring to the accompanying drawings, in which like numerals refer to like parts throughout the several views, the slicing machine generally comprises a pair of side frames 1 having a pair of pusher levers 2 pivoted thereto which are provided with a connecting cross bar 2' at their upper ends, the upper ends thereof being formed with forwardly projecting extensions 2''. As shown in Figs. 1 and 3, a pusher head 3 is pivoted to the forward ends of the extensions 2'' and is adapted to be reciprocated forwardly and rearwardly over a feed table 4 which is pivoted to the side frames 1.

The bread to be sliced is deposited onto the feed table 4 by the mechanism of the present invention which is about to be described, and is moved forwardly on the table 4 by the pusher head 3 to the reciprocating cutting blades 5 where it is sliced. As shown in Fig. 3, the pusher head 3 is preferably formed with a plurality of spaced notches or slots so that the projections between the slots can extend beyond the blades 5 to force the sliced bread beyond the same.

The mechanism for reciprocating the pusher levers 2 is clearly described in the previously mentioned copending applications.

The feeding device comprises a conveyor mechanism which carries the bread to a point approximately over the feed table 4 of the slicing machine where the bread is discharged onto an elevator or lowering device which deposits the bread in the correct slicing position on the table 4 in front of the pusher head 3, so that it can be correctly fed to the reciprocating blades 5. The conveyor, lowering device and pusher head thus are synchronized to coact and progressively feed loaves of bread to the slicing blades.

Referring to Figs. 1 and 7 to 11 inclusive, the conveyor mechanism comprises a pair of spaced longitudinal side bars 29 adjustably secured at their forward ends to the side frames 1 by brackets 28, the upper ends of the brackets 28 being secured to the frames 1 by bolts 28a which can be tightened to cause the brackets 28 to clamp the ends of the side bars against the frames 1. The side bars 29 are preferably held in spaced relationship by suitable U-shaped connecting members 30 having their upturned ends secured to the outer faces of the side bars 29. The conveyor is provided with forward and rearward transverse shafts 41 and 42 respectively, the shaft 42 being provided with an enlarged cylindrical portion or roller 43. The conveyor belt 38 is of the endless type and is mounted on the forward shaft 41 and the roller member 43.

Suitable guide bars 48 extending longitudinally of the conveyor are preferably secured to the connecting members 30 to guide and support the upper side of the belt 38 to prevent the same from sagging when in operation.

The forward conveyor shaft 41 is mounted at its ends in suitable brackets 40' which are secured to the foremost connecting member 30, as shown in Fig. 7, the brackets being formed with integral journals or bearings 40 through which the ends of the shaft 41 extend, and in which these ends are journaled.

Similarly, the ends of the rearward conveyor shaft 42 are journaled in suitable bearings which are carried by or formed integral with brackets 44. The brackets 44, as shown in Fig. 8, are movable longitudinally of the frame members 29 so that the slack in the belt 38 can be taken up or compensated for by moving the roller 43 forwardly or rearwardly.

Each frame side member 29 is provided with a U-shaped bracket 45, secured thereto by suitable bolts 47', which carries or supports an L-shaped member 46 having a screw 47 threaded through the depending leg thereof. The free ends of the bracket 44 are slidably positioned in the U-shaped bracket 45 and seat against the L-shaped member 46, as shown in Fig. 8. The end of the screw 47 abuts against the bearing portion of the bracket 44 and it is apparent that by turning the screws 47, the shaft 42 can be caused to move forwardly or rearwardly to obtain the correct tension of the conveyor belt 38.

The conveyor belt 38 is provided with a plurality of regularly spaced transversely-extending cleats 39 which positively engage the loaves of bread and prevent them from sliding on the belt, so that the bread will be discharged at regular intervals onto the elevator or lowering device, later to be described.

The belt 38 is so operated that upon each reciprocation of the pusher head 3 a loaf of bread is deposited upon the elevator device. This is accomplished by means of a ratchet arrangement which comprises a longitudinally movable pawl 54 that intermittently engages the cleats 39 of the conveyor belt 38.

A pair of U-shaped supports 49 are secured to a pair of adjacent connecting members 30, and carry a pair of spaced longitudinally positioned guide bars 50 and 51. The pawl 54, which is triangularly shaped and extends rearwardly and upwardly, is secured to a suitable drive bar 52. The drive bar 52 is positioned between the guide bars 50 and 51 and seats upon the supports 49 and is longitudinally guided thereby. The guide bars 50 and 51 provide suitable means for holding the drive bar 52 against lateral displacement. A transversely extending cross member 53 is secured to the lower face of the drive bar 52 rearwardly of the pawl 54 to serve as a suitable stop which limits the rearward travel of the drive bar 52 by engaging the rear support 49 and which also limits the forward travel of the bar 52 by engaging the front support 49. The cross member 53 also seats against the lower faces of the guide bars 50 and 51 to hold the drive bar 52 against vertical displacement.

The forward end of the pawl 54 is preferably formed with transverse projections 54' which extend beyond the sides thereof and ride on the guide bars 50 and 51 to substantially prevent bending of the drive bar 52 intermediate its ends.

The forward ends of the guide bars 50 and 51 are preferably bent or inclined downwardly at 50a and 51a respectively to guide and prevent the cleats 39 from catching the bars 50 and 51 in case slack occurs in the conveyor belt 38. The rear ends of the guide bars 50 and 51 are bent downwardly and twisted substantially 90 degrees to provide spaced supports 51b for a short transversely extending shaft 60. The shaft 60 is rotatable and has a suitable pulley 59 secured thereto which supports a belt or actuating chain 58. One end of the chain 58 is secured to a hook portion 61 mounted on the pusher lever cross bar 2', and the other end thereof is secured to a hook portion 62 which is mounted on the stop bar 53 by means of a suitable bolt 55 or other suitable securing means. It is apparent that the forward motion of the pusher levers 2 pulls on the chain 58 to move the drive bar rearwardly. The pawl 54 consequently engages the cleats 39 of the conveyor belt 38 to longitudinally move the same. As shown in the drawings, the cleats 39 are formed with angularly recessed portions 39a intermediate their ends to provide a suitable contacting portion for the pawl 54.

When the pusher levers 2 are retracted the drive bar 52 is moved forwardly by means of a suitable spring 56 having one end attached to the bolt 55 and the other end attached to a bracket 57 which is secured to one of the frame members 1.

In the operation of the conveyor, forward movement of the pusher moves the drive bar 52 rearwardly and the pawl 54, being in engagement with one of the cleats 39, consequently moves the belt 38 a distance equal to the length of travel of the drive bar 52 to discharge a loaf of bread onto the elevating mechanism. Upon rearward movement of the pusher, the spring 56 draws the drive bar 52 forwardly so that the pawl 54 slides underneath the next adjacent cleat 39 and engages the same in position to again actuate the conveyor belt 38. It is thus seen that the conveyor belt 38 is intermittently actuated by the pusher.

Bread carried by the conveyor belt is guided and centered by means of spaced guide members 31, the rear ends of which are preferably secured to the conveyor side bars 29 by bolts 36, and the intermediate portions of which are secured to the side bars 29 by bolts 35. The bolts 35 are preferably provided with spacers 34 which space the guide members 31 the desired distance from the side bars 29 and from each other.

The guide members 31 are preferably made of resilient material and the forward ends are curved inwardly and attached to adjustable supports 32 comprising horizontal and vertical portions. The horizontal portions of each support 32 are formed with a slot 32a and are bolted to a stationary bracket 37 by bolts 33, the bracket 37 being secured to the outer face of the side frame 29. As shown in Fig. 8, the horizontal portion of the adjustable support 32 extends through a slot 29a formed in the side frame 29. The forward ends of the guide members 31 can thus be adjusted and correctly spaced, so that the bread being carried by the conveyor will be automatically centered thereon and discharged in the correct position onto the elevator device. The guide members 31 can also be adjusted to accommodate different lengths of bread.

In addition to serving as centering means for the bread, the guide members 31 also provide means for causing the bread to be discharged either on its bottom or on its side onto the elevator device. By adjusting the guide members 31 so that they merely contact with the bread as it moves between the same the bread will be so discharged that its bottom engages the elevator devices. Furthermore, by adjusting the guide members so that they have considerable friction with the ends of the bread, the bread will tilt and fall on its side onto the elevator devices.

It is apparent that the conveyor is positioned somewhat above the feed table 4 of the slicing machine and that means must be provided for transferring the bread to the table in the desired position. This is accomplished in the present invention by means of new and novel elevator or lowering devices, which are slidably mounted upon a pair of spaced vertical bars 8 secured to each frame member 1 by upper and lower retainer blocks 6 and 7.

As both elevator devices are of identical construction, one being mounted on one pair of bars 8 at one side of the machine and the other being similarly mounted at the other side of the machine, only one of the same will be described in detail.

Figures 4, 5:
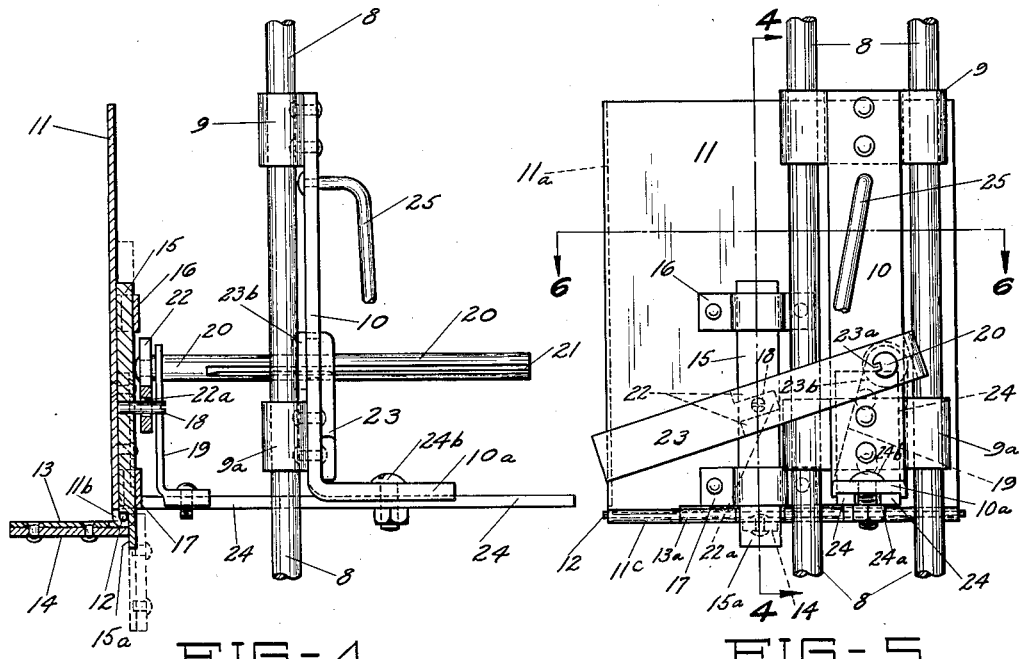
Fig. 4 is an enlarged detail sectional elevation of the elevator taken substantially on the line 4—4 of Fig. 5.
Fig. 5 is an enlarged detail side elevation of the elevator.
Figure 6:
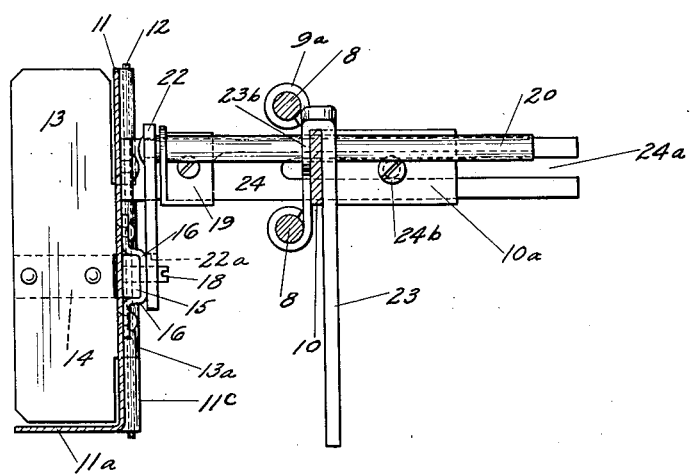
Fig. 6 is an enlarged horizontal section taken substantially on the line 6—6 of Fig. 5.

A pair of spaced horizontal slide bars 9 and 9a, interconnected by a side piece 10, are slidably mounted on the vertical rods 8, the side piece 10 serving to correctly space the cross pieces 9 and 9a and to prevent binding of the same on the rods 8 as they are reciprocated thereon. The side piece 10 is formed with a horizontally and outwardly extending flange 10a at its lower end to which a horizontal support 24 is secured intermediate its ends by a bolt 24b, the support being longitudinally slotted at 24a so that it can be adjusted longitudinally of the flange 10a to compensate for loaves of bread of different lengths. As shown in Figs. 4 to 6, the inner end of the support 24 is bent upwardly and is riveted or bolted to a vertically positioned elevator side plate 11, the plate 11 being disposed substantially parallel with the cutting blades 5. The forward end of the plate 11 is bent inwardly at right angles, as viewed in Fig. 3, to provide a substantial end stop 11a which prevents the bread from being carried beyond the elevator as it is moved thereonto from the conveyor belt 38.

The lower edge of the side plate 11 is slotted at 11b and is rolled at each side of the slots 11b to provide bearings 11c which carry a pivot pin 12. The pin 12 pivotally or hingedly supports a bed plate 13, which has rolled extensions 13a at its edge through which the pin 12 extends. The extensions 13a extend into the slots 11b of the side plate 11 and are in alignment with the rolled edges 11c to provide a piano hinge effect. The bed plate 13 is thereby adapted to swing from a horizontal to a vertical position and vice versa.

As shown in Figs. 4 to 6, a flat plate 14 is riveted or otherwise secured to the lower face of the bed plate 13 and the outer end thereof extends substantially beyond the pivotal axis of the bed plate 13, for reasons that will be apparent.

The bed plate 13 is normally held in horizontal position, as shown in Fig. 4, by a vertical latch bar 15 slidably mounted in upper and lower U-shaped guides 16 and 17 which are secured to the outer face of the plate 11. The lower end of the latch bar 15 is formed with a shoulder which engages the pivot pin 12 to limit the downward movement of the latch bar, and with a depending finger 15a. The inner flat face of the finger 15a as shown in Fig. 4, is adapted to bear against the end face of the flat plate 14 to hold the bed plate 13 in horizontal position. When the bed plate 13 is in its vertical position, as shown in broken outline, and the latch bar is raised, the latch bar 15 on its downward movement strikes the corner of the plate 14 which extends beyond the pivotal axis of the bed plate 13, and causes the bed plate 13 to swing back to its normal horizontal position.

The latch member 15 is actuated by a lever arrangement comprising a horizontal outwardly extending pin 18 secured thereto, which extends through a slot 22a formed in one end of a lever 22, the lever 22 being mounted on a shaft 20. The end of the shaft 20 adjacent the lever 22 is rotatably supported in a bracket 19 which is secured to the horizontal support 24. The shaft 20 also extends transversely through the side piece 10, and is provided with a lever 23 having one end 23b bent back upon itself to embrace the side piece 10. The shaft 20 extends through both portions of the doubled end 23b of the lever 23, and the lever is formed with an integral key portion 23a which seats in a longitudinal groove 21 formed in the shaft 20. The keyway or groove 21 is of sufficient length to permit the elevator device to be adjusted to meet the requirements of different lengths of bread. It is apparent that by loosening the bolt 24b the support 24 can be horizontally moved relative to the side piece 10.

As shown in Fig. 1, upper and lower trips 26 and 27 are respectively secured to the frame 1 by bolts 26a and 27b in such position that they will be engaged by the levers 23 as the elevating devices are reciprocated. The trip members 26 and 27 are provided with suitable adjusting means so that the bed plates 13 can be tripped at different points of travel of the elevator devices.

Referring to Figs. 1 and 2, it is obvious that, as the elevator devices are moved downwardly, the levers 23 engage the lower trips 27 and cause the shafts 20 to rotate, thereby raising the latch members 15 out of engagement with the plates 14, so that the weight of the bread will cause the bed plates 13 to swing to their vertical positions and deposit the bread on the feed table 4. It is further obvious that, as the elevator devices move upwardly, the levers 23 will engage the upper trips 26 and rotate the shafts 20 in the opposite direction, which causes the latch members 15 to move downwardly and swing the bed plates 13 to their normal bread receiving position.

The elevator devices just described, as shown in Fig. 2, are arranged in horizontal alignment so that the bread is horizontally supported by the bed plates 13. These devices are simultaneously reciprocated in a vertical direction by a pair of links 25 having their upper ends pivoted to the side pieces 10 and their lower ends pivoted to levers 25a. The levers 25a are keyed to a shaft 25f, which extends transversely of the frame members 1. Downwardly and forwardly curved cams 25e secured to the shaft 25f slidably contact with lifting arms 25g which are secured to the pusher members 2. The lifting arms 25g preferably slide upon guide pins 25h secured to the frame members 1.

When the pusher is in its forward position, as shown in Fig. 1, the cams 25e are held in an upward position by the lifting arms 25g, but when the pusher is retracted to its rearmost position the cams 25e drop to the position shown in Fig. 12, beyond the ends of the lifting arms 25g, the elevator devices being of such weight that they automatically slide downwardly along the guide rods 8 as soon as the lifting pressure on the cams 25e is released.

The descent of the elevator devices is preferably cushioned by means of a light tension spring 25b which is attached to a bracket 25c by an eye bolt 25d and to one of the levers 25a between the ends thereof. The spring 25b is of sufficient tension to cushion the descent of the elevators and does not prevent the elevators from descending to a point where the levers 23 will be actuated by the trips 27.

From the drawings and the foregoing description of the present invention it is apparent that the conveyor, elevating devices and pusher are so arranged and so synchronized that loaves of bread can be continuously fed to the slicing blades and sliced.

The bread to be sliced is either manually or mechanically placed upon the upper half of the conveyor belt 38 and as the belt is intermittently moved forwardly by the pawl 54 the cleats 34 come in contact with the adjacent loaves of bread and carry them forwardly.

The bread, if it is placed too far to one side or the other of the belt 38, comes in contact with the nearest guide member 31 and is forced to a position centrally of the conveyor.

As the bread reaches the forward end of the conveyor it is carried forwardly and falls by gravity upon the elevator bed plates 13. This occurs just prior to or as the pusher head 3 has moved a preceding loaf through the cutting blades 5. At the instant the pusher 3 reaches its rearmost position the lifting arms 25g release the pressure on the cams 25e, and the elevator devices having the bread positioned thereon move downwardly by gravity and, at the desired point above the table 4, the levers 23 engage the lower trips 27 and rotate the shafts 20, thereby causing the latch bars 15 to become disengaged from the bed plates 13. As a result, the bed plates 13 swing to their vertical positions adjacent the feed table 4 and the bread falls by gravity to the table 4 at about the time the pusher again starts its forward movement. Simultaneous with the rearward movement of the pusher 23 the pawl 54 travels forwardly beyond the next preceding cleat 39, so that upon forward movement of the pusher 23 the pawl 54 engages the adjacent cleat 39 and moves the lower side of the belt rearwardly, which moves the next loaf of bread into position. At the same time, that is, as the pusher moves forwardly, the lifting arms 25g engage the cams 24e and thereby cause the elevator devices to move upwardly. The levers 34 of the elevator devices engage the upper trip members 26 just as the pusher 3 moves the bread into initial contact with the blades 5 and cause the latch members 15 to swing the bed plates 13 into horizontal position. Immediately thereafter, the conveyor which has been simultaneously moved a sufficient distance, discharges another loaf of bread onto the elevator devices and the process or operation is again repeated.

In general, loaves of bread are successively fed from a conveyor to an elevator device which successively lowers each loaf in correct slicing position onto a feed table in front of the pusher and which, after depositing a loaf on the feed table, moves upwardly to receive a succeeding loaf.

It is apparent that many new and novel features are presented by the present invention which greatly increase the efficiency of operation of bread slicing machines, particularly in view of the fact that manual labor is reduced to a minimum.

In the appended claims the elevator devices for lowering the bread from the conveyor to the feed table will be referred to as a table loading device.

Furthermore, it is to be understood that the particular forms of apparatus shown and described, and the particular procedure set forth, are presented for purposes of explanation and illustration and that various modifications of said apparatus and procedure can be made without departing from my invention as defined in the appended claims.

What I claim is:—

1. In a bread slicing machine, slicing means, and a feed table adjacent said slicing means, a reciprocable table loading device having means for receiving a loaf of bread at one end of its stroke and for discharging the loaf onto said table in slicing position adjacent said slicing means at the other end of its stroke, and means for reciprocating said table loading device.

2. In a bread slicing machine, slicing means, and a feed table adjacent said slicing means, a reciprocable table loading device having a bread supporting member, a latch for holding said member in bread supporting position, means for disengaging said latch from said supporting member as said device reaches the end of its discharge stroke, to permit the bread supported thereby to be loaded onto said table in slicing position adjacent said slicing means, and means for reciprocating said table loading device.

3. In a bread slicing machine, slicing means, a plurality of slicing blades and a feed table adjacent said slicing means, a reciprocable table loading device having a bread supporting member pivoted thereto, means for holding said member in bread supporting position during the table loading stroke of said device, means for tripping said first mentioned means to permit said bread supporting member to pivot and discharge the bread supported thereby onto said table in slicing position adjacent said slicing means, and means for reciprocating said table loading device.

4. In a bread slicing machine, slicing means, having a plurality of slicing blades and a feed table adjacent said slicing means, a reciprocable table loading device having a pivoted bed plate, a latch member engageable with said plate to hold the same in horizontal bread supporting position, means for disengaging said latch member from said plate as said device is moved to table loading position, whereby said plate may pivot to discharge the bread supported thereby onto said table in slicing position adjacent said slicing means, and means for reciprocating said table loading device.

5. In a bread slicing machine, slicing means, a feed table adjacent said slicing means, a reciprocable table loading device mounted for vertical movement, means for reciprocating said device, a bread supporting plate pivoted to said device, a latch member engageable with said plate to hold the same in horizontal bread supporting position, means for disengaging said latch member from said plate at the end of the downward stroke of said device, whereby said plate may pivot and discharge the bread supported thereby onto said table in slicing position adjacent said slicing means, and means at the end of the upward stroke of said device for causing said latch to move said plate into horizontal bread supporting position.

6. In a bread slicing machine, slicing means, a feed table adjacent said slicing means, and a table loading device comprising a pair of horizontally aligned, slidably mounted bread supports positioned above the feed table near the opposite ends thereof, means for alternately moving said supports downwardly and upwardly, said supports being adapted to receive the bread in their uppermost position, and means for discharging the bread from said supports onto said table in slicing position adjacent said slicing means when said supports have reached their lowermost position.

7. In a bread slicing machine, slicing means, a feed table adjacent said slicing means, and a table loading device comprising a pair of slidably mounted side plates positioned above the feed table near the opposite ends thereof, means for reciprocating said plates downwardly and upwardly, and horizontally aligned bed plates pivoted to said side plates and adapted to receive and support a loaf of bread when said side plates are moved to their uppermost position, and to discharge the loaf supported thereby onto said table in slicing position adjacent said slicing means when said plates are moved to their lowermost position.

8. In a bread slicing machine, slicing means, and a feed table adjacent said slicing means, and a table loading device comprising a pair of vertically reciprocable side plates positioned above the feed table near the ends thereof, means for reciprocating said side plates, horizontally aligned bed plates pivoted to said side plates and adapted to receive and support a loaf of bread in their uppermost position, latch members for holding said bed plates in horizontal alignment, and lower trip means adapted to release said latch members when said side plates are moved to their lowermost position, whereby said bed plates may pivot and discharge the loaf supported thereby onto said feed table in slicing position adjacent said slicing means.

9. In a bread slicing machine, slicing means, and a feed table adjacent said slicing means, and a table loading device comprising a pair of vertically reciprocable side plates positioned above the feed table near the ends thereof, means for reciprocating said side plates, horizontally aligned bed plates pivoted to said side plates and adapted to receive and support a loaf of bread in their uppermost position, latch members for holding said bed plates in horizontal alignment, lower trip means adapted to release said latch members when said side plates are moved to their lowermost position, whereby said bed plates may pivot and discharge the loaf supported thereby onto said feed table in slicing position adjacent said slicing means, and upper trip means for engaging said latch members as said side plates reach their uppermost position to move and hold said bed plates in horizontal bread receiving position.

10. In a bread slicing machine, slicing means, a feed table adjacent said slicing means, vertically movable table-loading devices for supporting the bread to be sliced and for depositing the same in slicing position on said table, positive lifting means for raising said devices to their uppermost bread receiving position, and means for releasing said lifting means to allow said devices to descend by gravity and deposit the loaf carried thereby onto said cutting table in slicing position adjacent said slicing means.

11. In a bread slicing machine having a feed table, the combination with vertical guides and a table loading device slidably mounted on said guides, of positively actuated lifting means for raising said device to its uppermost position and means for releasing said lifting means at a given point to allow said device to descend by gravity.

12. In a bread slicing machine having a feed table, the combination with vertical guides and a table loading device slidably mounted on said guides, of positively actuated lifting means for raising said device to its uppermost position, means for releasing said lifting means at a given point to allow said device to descend by gravity, and means for cushioning the descent of said device.

13. In a bread slicing machine having a feed table, a table loading device comprising vertically positioned slidable bread supports positioned above said feed table near the opposite ends thereof, said supports being adapted to receive a loaf of bread in their uppermost position and to discharge said bread onto said table in their lowermost position, positively actuated lifting means for raising said supports to their uppermost position, and means for releasing said lifting means at a given point to allow said supports to descend to their lowermost position by gravity.

14. In a bread slicing machine having a feed table, a table loading device comprising slidably and vertically mounted bread supports positioned above said feed table near the opposite ends thereof, said supports being adapted to receive a loaf of bread in their uppermost position and to discharge said bread onto said table in their lowermost position, positively actuated lifting means for raising said supports to their uppermost position, means for releasing said lifting means at a given point to allow said supports to descend to their lowermost position by gravity, and means for cushioning the descent of said supports.

15. In a bread slicing machine having a feed table, a vertically movable table feeding device slidably mounted over said feed table, spaced bread supporting plates hinged to said device, means for maintaining said plates in horizontal bread supporting position during the upper portion of the travel thereof, and means for tripping said plates as said device substantially reaches the lowest point in its downward travel, whereby the bread carried thereby may be discharged onto said feed table.

16. In combination in a bread slicing machine, bread slicing means, a bread supporting feed table adjacent said slicing means, a pusher movable over said table for feeding a loaf of bread to said slicing means, and a vertically reciprocable table loading means adapted to receive and support a loaf of bread during the upper portion of its travel and to discharge the loaf onto said table during the lower portion of its travel in slicing position, whereby said pusher may then feed the loaf to and through said slicing means.

17. In combination in a bread slicing machine, slicing means, a bread supporting feed table adjacent said slicing means, a pusher movable over said table for feeding a loaf of bread to said slicing means and a vertically reciprocable table loading means having pivoted bread supports thereon adapted to receive and support a loaf of bread during the upper portion of the travel of said means and to discharge said loaf onto said feed table during the lower portion of the travel of said means, said pusher and table loading means being so synchronized that said means receives a loaf of bread while said pusher is feeding a loaf of bread to said slicing means, and discharges said first mentioned loaf onto said table as said pusher is being moved to its retracted non-operative position.

18. In combination in a bread slicing machine, slicing means, a feed table adjacent said slicing means a pusher movable over said table to feed the loaf supported thereby to said slicing means, a table loading means having aligned bread supports for receiving a loaf of bread in their uppermost position and discharging the loaf onto said table in their lowermost position, and a conveyor for discharging a loaf of bread onto said supports, said conveyor, loading means and pusher being synchronized to progressively feed loaves of bread to said slicing means.

19. In combination in a bread slicing machine, bread slicing means, a bread supporting table adjacent said slicing means, a pusher movable over said table for feeding the bread supported thereby to said slicing means, and a vertically reciprocable table loading device having spaced bread supports thereon for receiving and supporting a loaf of bread during the upper portion of the travel of said device and for discharging said loaf onto said table during the lower portion of the travel of said device, said table loading device being directly actuated in an upwardly direction by said pusher as said pusher moves the loaf over said table to said slicing means.

20. In a bread slicing machine having a bread supporting feed table, a pair of vertically reciprocable devices for discharging bread in slicing position onto said table, each of said devices comprising a vertical side plate positioned above and near an end of said table, a bread support hinged to said plate, and a latch member engageable with said support for holding said support in horizontal position during the upper portion of travel of said device, said latch member being disengaged from said support at a given point during the lower portion of travel to permit said support to swing downwardly to a bread discharging position.

21. In a bread slicing machine having a bread supporting feed table, a pair of vertically reciprocable devices for progressively discharging loaves of bread in slicing position onto said table, each of said devices comprising a vertical side plate positioned above and near an end of said table, a bread support hinged to said plate, and a latch member engageable with said support for holding said support in horizontal position during the upper portion of travel of said device, lower trip means for disengaging said latch member from said support as said device reaches its lowermost position whereby said support may swing downwardly to bread discharging position, and upper trip means for causing said latch member to swing said support to horizontal position as said device reaches its uppermost position.

In testimony whereof, he affixes his signature.

OTTO F. ROHWEDDER.